Aug. 24, 1965 W. T. BUHL 3,202,026
APPARATUS AND METHODS FOR SEPARATING SUCCESSIVE LENGTHS OF TUBULAR MATERIAL
Filed Jan. 24, 1963 2 Sheets-Sheet 1
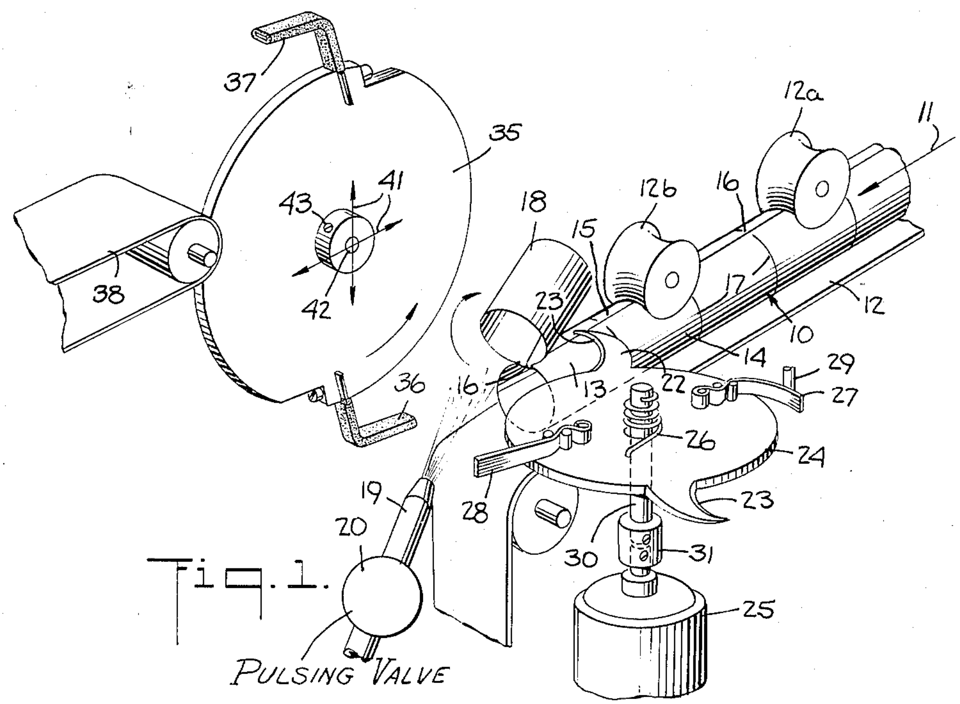
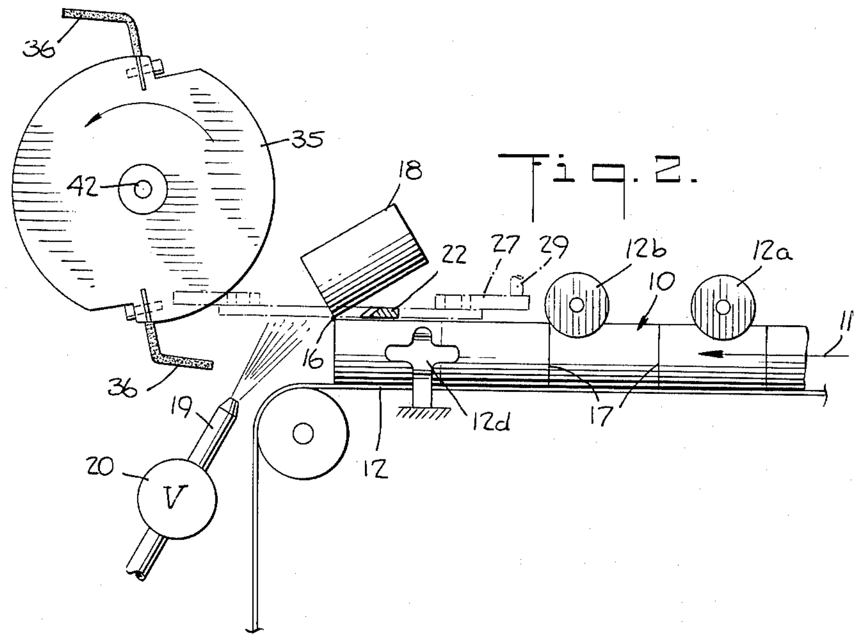

40
50
37
39
39
41
43
42
35
38
36
18
12b
11
12a
16
16
12
10
16
22
29
26
24
23
19
V
30
31
25

40
39
35
42
43
18
10
12d
12d
12
19

10
11
16
18'
51
22'
12
19'
V
23'
15'
18'
16'
15'
17'

13'

United States Patent Office 3,202,026

Patented Aug. 24, 1965

3,202,026

APPARATUS AND METHODS FOR SEPARATING SUCCESSIVE LENGTHS OF TUBULAR MATERIAL

Walter T. Buhl, Larchmont, N.Y., assignor to American Machine & Foundry Company, New York, N.Y., a corporation of New Jersey Filed Jan. 24, 1963, Ser. No. 253,607
7 Claims. (Cl. 83—161)

This invention relates to apparatus and methods for separating successive lengths of tubular material, the invention being particularly adapted, among other possible uses, to the separation of attached successive lengths of sheet metal can stock.

Heretofore apparatus and methods have been developed for forming sheet metal can bodies by rapidly advancing a strip of the sheet metal through a tube mill in which the strip is formed into a tube and as the side edges of the strip are brought together, same are longitudinally welded together. In order that such tubing may be more readily separated into finite lengths corresponding to the desired length of each can body, according to one known method the sheet metal strip before passing into the tube mill is transversely slit by slits spaced apart at distances equal to the desired lengths of the can bodies, such slits, however, terminating short of each edge of the strip so that when the strip is formed and welded into a tube, the successive can bodies will each be separated from the next preceding and succeeding ones by such slits, except that narrow unslit tabs are left where the weld line occurs along the can bodies, these unslit tabs being for example from $\frac{3}{16}''$ to $\frac{1}{2}''$ wide. Thus the tubular can bodies in this way may be rapidly advanced after the longitudinal welding has been accomplished, as a succession of units, all preferably in axial alignment and all still interconnected but only by such narrow tabs occurring at the weld line.

Inasmuch as by known welding methods such successions of can bodies may be made at very high speed, for example in the range of from 300 to 1000, or even 2000, cans per minute, it becomes desirable to provide some form of automatic means for rapidly, economically and reliably completing the separation of the successive cans from each other.

The present invention provides a solution for this problem by a method and arrangement which involves first deflecting each successive tube length or can body to a position such that its axis becomes more or less transverse to the axis of the succeeding series of bodies. By such deflecting step, each small tab which interconnects one body to the next, will become bent to a position transverse to the axis of the succession of bodies, whereupon suitable means are provided, in properly timed relationship to such deflection, for striking the bent tab and severing same, thereby releasing each deflected tubular length from the succeeding succession of lengths.

Such operation of deflecting each tubular length or can body to a position transverse to the path of the succeeding ones, may be accomplished either by suitably timed, automatically-operating mechanical means for engaging and deflecting each of the items, or preferably by the use of a fluid jet, such as an air or liquid jet, positioned to impinge against each can body or tube length as it arrives at a predetermined position and causing same to be "flipped" to the desired deflected position, for example either about at right angles to the axis of the succeeding series of cans, or over to a position beyond such a right angle position as the tab connecting same to the next can body becomes bent over. Then a blade, for example preferably rotatably mounted, is arranged to strike against the bent-over tab and sever same. The separated can body is then ready to drop off onto a suitable conveyor, or, if desired, suitable means may be provided for coming into a hooking or similar engagement with the released can body and to carry same to another position for discharge onto a conveyor or other means.

Various further and more specifiic objects, features and advantages of the invention will appear from the description given below, taken in connection with the accompanying drawings, illustrating by way of example preferred forms of the invention.

In the drawings:

FIG. 1 is a somewhat diagrammatic perspective view of one embodiment of the invention;

FIG. 2 is a side elevational view of the same arrangement;

Figures 3, 4, 5, 6:
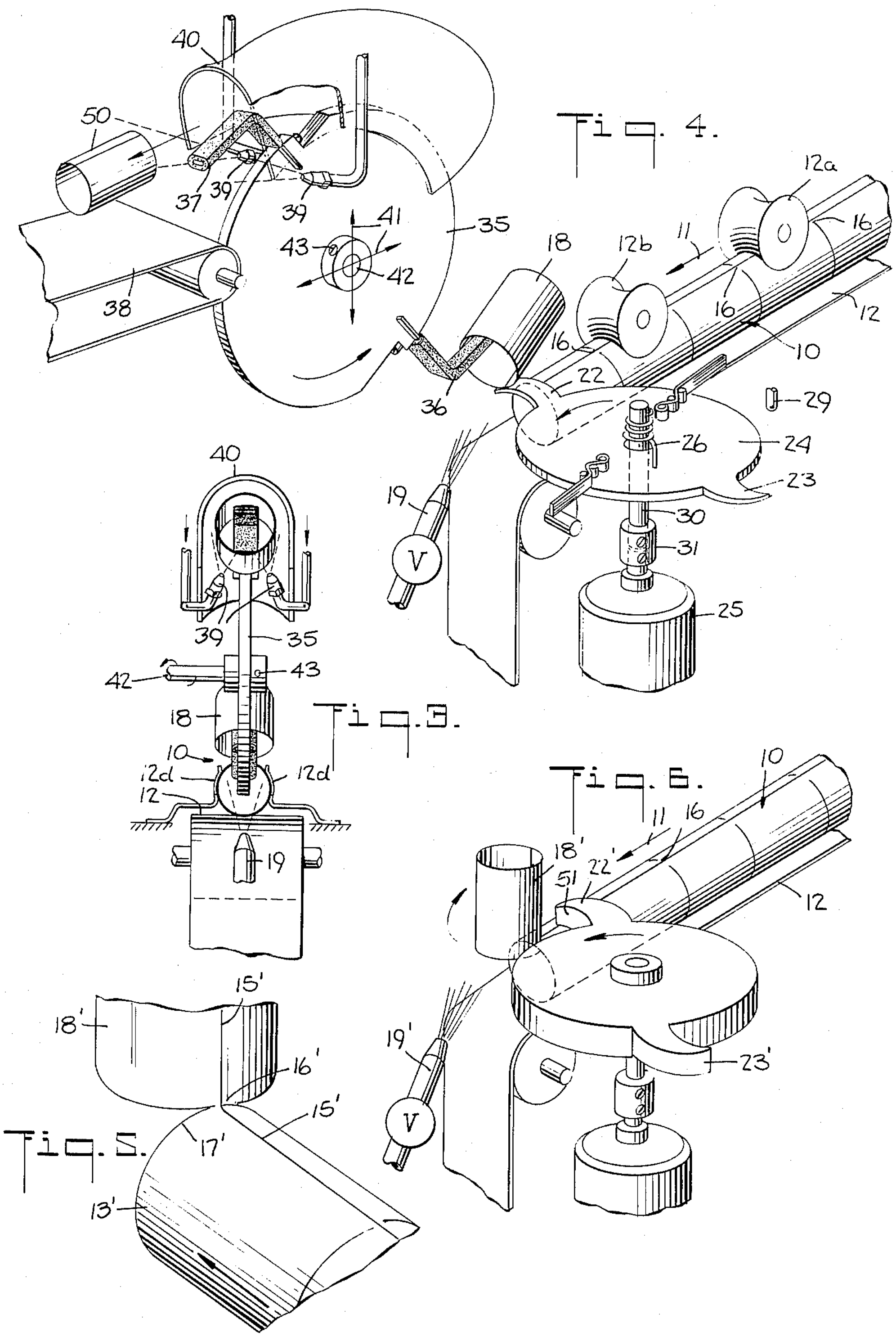
FIG. 3 is an end elevational view thereof.
FIG. 4 is another diagrammatic perspective view similar to that of FIG. 1, but showing the parts in a somewhat different position of operation.
FIG. 5 is a detailed perspective view illustrating more clearly the nature of the above-mentioned tabs afer same have been bent to a position ready for severing.
FIG. 6 is a diagrammatic view of portions of another embodiment of the invention.

Referring to the drawings in further detail, an interconnected succession of the can bodies or the like tubular member which are to be separated, is indicated generally at 10, same being advanced in the direction of the arrow 11 while they are being supported and held by any suitable conveying means of known type, partially indicated at 12, 12*a* and 12*b*, and which, as will be understood, should be so constructed and arranged as to advance the succession of connected can bodies at speeds such as above stated and while they are preferably held in axial alignment. Means should be provided, such for example as spring finger means at 12*d* (see FIGS. 2 and 3), for frictionally restraining each can of the series against being prematurely dislodged from its proper position on the conveyor.

As will be apparent from the drawings, the successive short tubular bodies as at 13, 14, are each longitudinally welded along a weld line, as indicated at 15, and except for the regions of the tabs 16, same are separated by circumferentially-extending slits as at 17.

As each can body, such as the one indicated at 18 in FIGS. 1 and 2, arrives at a position where it is to be separated from the succeeding ones, it is deflected upwardly and preferably over and somewhat rearwardly as indicated in these figures, by suitable means such as a fluid jet 19. If desired, this jet may be intermittently operated at moments corresponding to the arrival of each can body to a position above the same, such intermittent operation, if necessary or desired, being controlled as by providing a pulsating form of valve 20, driven, if desired, by suitable pulsing means in synchronism with the other moving parts of the apparatus hereinafter described. In some cases, however, it may be found unnecessary that the jet operate with timed pulses if the jet is properly positioned to engage each can body as it comes into position thereover.

The condition of the interconnecting tabs between the can bodies as each of the latter becomes deflected, will be more fully apparent from FIG. 5, wherein a can body 13′ is still advancing along its axis in the direction of the arrow, as indicated, whereas a can body 18′ has been deflected at right angles to the succeeding bodies so that the interconnecting tab 16′ which includes the weld line 15′, will assume the condition here shown and ready to be severed. However, with the particular arrangement shown in FIGS. 1 to 4 inclusive, the deflected can body is preferably thrust over and somewhat rearwardly so that the connecting tab will provide in effect a V-shaped notch, well adapted to receive and be severed by blade means such as now will be described.

As shown in the embodiment of FIGS. 1 to 4, either one blade, or a plurality thereof as indicated at 22 and 23, are rotatably mounted, for example integrally with and at the periphery of a rotating disc 24, positioned so that the blades at properly timed intervals will strike the rear surface of each of the bent-over tab areas 16, thereby severing same and releasing the deflected can bodies.

The blade or blades 22, 23 as mounted on the rotating disc or other suitable mounting means, may be driven by motor means 25, including suitably adjustable speed reducing gearing, if necessary or desired, and so as to drive the blades at a speed properly correlated with the speed of the can bodies on the conveyor means therefor, and whereby one of the blades will strike one of the tabs 16 just as one of the can bodies has been deflected to rearwardly directed position.

In the event that the blades are arranged to move at a moderate speed, it may be desirable momentarily to increase the speed thereof just as same are about to sever each tab. This may be readily accomplished by any suitable impulse mechanism which causes the blade-supporting disc, or other supporting means, momentarily to increase its speed just as the blade is about to engage and sever a tab; for example, an arrangement such as shown somewhat schematically in FIGS. 1 and 4 may be used, wherein the disc 24 is connected to the driven shaft of the motor by a spring 26. Suitable means such as leaf springs 27 and 28 may be then mounted on the disc 24 at positions in advance of each of the blades and adapted each to engage a stationarily mounted pin as at 29, at a time shortly prior to the moment when the blade is to strike one of the tabs 16, thereby momentarily to check the speed of the blade and to release same with a snap action as the spring snaps past the pin 29. This particular form of impulse means is shown somewhat diagrammatically here merely by way of example, and it will be understood that other forms, well known in various mechanical arts such as magneto arrangements, could be used alternatively to provide the blades with the desired rapidly increased speed at the moment of impact. In case the blade movement is quite rapid, such an impulse mechanism will not be necessary.

In order that the blades will be so operated as to strike the tabs 16 at the proper moments, suitable means may be provided for operating same in synchronism and at properly timed intervals with respect to the operation of the conveying means. For example, the drive shaft 30 for the disc may be connected to the motor drive means through suitable angularly adjusted coupling means as at 31, so that the blades may be brought into the desired angular positions at the proper moments, and the motor may, of course, be provided with suitable known speed adjustable means. At the same time suitable mechanical gearing (not shown) may be used to connect the motor drive with the conveyor drive means and also to the pulsating valve 20, in case a pulsating valve is used.

As further shown in FIGS. 1–4, means are provided for engaging each of the cans as its connecting tab is severed from the succeeding cans and, with the form here shown for that purpose by way of example, a rotating disc or the like as at 35 may be provided with suitable yieldably mounted or springy hook-like means as at 36, 37, same being shaped to enter and engage each deflected can as it becomes free, and to carry same around, for example to a conveyor as at 38. These hook means are preferably covered with rubber or some resilient material so that they will not mar the can bodies. The effect of centrifugal force will be such that usually some means may be necessary to throw each can from its hook at the proper time. While mechanical means might be provided for this purpose, with the arrangement shown in FIGS. 1–4, the cans as they are carried up around on the hooks may pass air or liquid jets as at 39, one located at each side of the path of the hooks and so directed as to blow the cans from the hooks onto the conveyor 38. The region of the jets may, if desired, be surrounded by a hood 40 to confine the jet streams to the region of the can bodies.

The axis or supporting shaft of the member 35 may be preferably so mounted as to be adjustable in positions both horizontally and vertically, as indicated by the arrows 41 in FIG. 1, so as to bring the hook means into proper positions for engaging can bodies of various sizes or positions as they become severed and released. It will also be understood that the rotating supporting means 35 should be driven at a speed synchronous with the blades 22, 23, and with proper relative timing, so that the hooks will engage each severed can at the moment it becomes free. For this purpose, suitable known types of gearing, not shown, may of course be used to interconnect the drive shaft 42 for the member 35, with the motor drive means, and as by adjustable set screw means as at 43, the angular position of the supporting means 35 may be adjusted for proper timed relation to engage each severed can body at the appropriate moment.

FIGS. 1, 2 and 3 illustrate the positions of the parts just before one of the can bodies 18 is to be severed and FIG. 4 illustrates the relative positions of the parts just after a can body 18 has been severed and is about to be engaged by the hook means 36. FIG. 4 also illustrates the position of one of the can bodies 50 just after same has been thrown from the hook means 37.

The embodiment of the apparatus shown in FIG. 6 is similar to that of the figures above described, except that here one of the can bodies 18' is shown deflected to a vertical position and rotating blades as at 22' and 23' are provided with shapes such that their forward edges, one of which is indicated at 51, will come into more or less flatwise engagement with the side wall of the deflected can in the area just at and above its lower end. With such engagement the separated can bodies will be thrust forwardly away from the separating apparatus to a position to be carried away by any suitable conveying means.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for separating a succession of tubular members of which each is connected to a succeeding member by a tab-like portion integral therewith, said apparatus comprising in combination: means for conveying the succession of members along a predetermined path; means for deflecting the forward one of said members through an angle of about 90° at least when it arrives at a predetermined location and thus to a position transverse to said path, thereby bending the tab which interconnects same with the succeeding member; movable means for striking such bent tab at the rear thereof and severing same; and means for driving said movable means and conveyor means in such timed relation that the movable means will engage and sever such interconnecting tabs as each member assumes its deflected position, thereby releasing each forward one of said members from those succeeding.

2. Apparatus for separating a succession of tubular metal members of which each is connected to a succeeding member by a relatively narrow tab portion integral therewith, said apparatus comprising in combination: means for conveying the succession of members along a predetermined path; means for deflecting the forward one of said members and the tab which connects it to the next member through an angle of about 90° at least when it arrives at a predetermined location and thus to positions transverse to said path, and movable blade-like means for engaging such bent interconnecting tab at the rear thereof and severing same, thereby releasing the forward one of said members from those succeeding.

3. Apparatus for separating a succession of metal members of which each is connected to a succeeding member by a tab-like portion integral therewith, said apparatus comprising in combination means for conveying the succession of members along a predetermined path, a fluid jet for deflecting the forward one of said members when it arrives at a predetermined location to a position transverse to said path thereby bending the tab which interconnects same with the succeding member, movable means for engaging such bent tab and severing same and means for driving said movable means and conveyor means in such timed relation that the movable means will engage and sever such interconnecting tabs as each member assumes its deflected position, thereby releasing each forward one of said members from those succeeding.

4. Apparatus for separating a succession of metal members of which each is connected to a succeeding member by a tab-like portion integral therewith, said apparatus comprising in combination means for conveying the succession of members along a predetermined path, a fluid jet for deflecting the forward one of said members when it arrives at a predetermined location to a position transverse to said path thereby bending the tab which interconnects same with the succeeding member, movable means for engaging such bent tab and severing same and means for driving said movable means and conveyor means in such timed relation that the movable means will engage and sever such interconnecting tabs as each member assumes its deflected position thereby releasing each forward one of said members from those succeeding, and said fluid jet being constructed and arranged to direct pulses of fluid in predetermined timed relation to the movement of said metal members by the conveying means.

5. Apparatus in accordance with the foregoing claim 2 and in which the blade-like means is rotatably mounted and means is provided to rotate same in predetermined timed relation to the movement of the conveyor means.

6. Apparatus in accordance with the foregoing claim 2 and in which means are provided to engage each of the tubular members when released and to discharge same at a point spaced from the location of their release.

7. Apparatus in accordance with the foregoing claim 6 and in which the means for engaging the released tubular members comprises hook-like means rotatably mounted to enter into engagement with the tubular members as same are released and to carry same away on a circular path.

References Cited by the Examiner

UNITED STATES PATENTS

| | | | |
|---|---|---|---|
| 1,605,816 | 11/26 | Dietrich | 83—23 |
| 1,813,340 | 7/31 | Conti | 83—154 |
| 1,917,806 | 7/33 | Miller | 83—337 X |
| 1,963,902 | 6/34 | Hires | 83—23 |
| 2,151,136 | 3/39 | Moffitt | 83—24 |
| 2,318,953 | 5/43 | Meyer | 83—161 X |
| 2,723,668 | 11/55 | Pool | 83—355 X |
| 2,792,887 | 5/57 | Middelhof | 83—355 |
| 2,808,105 | 10/57 | Krohne | 83—161 |
| 2,840,164 | 6/58 | Rudszinat | 83—161 |
| 2,984,138 | 5/61 | Vitense et al. | 83—337 X |

ANDREW R. JUHASZ, *Primary Examiner.*

WILLIAM W. DYER, Jr., *Examiner.*